US007731451B2

(12) United States Patent
Roberts

(10) Patent No.: US 7,731,451 B2
(45) Date of Patent: Jun. 8, 2010

(54) MAGNETIC COVER REMOVER

(75) Inventor: Dave Roberts, Andover, MN (US)

(73) Assignee: Rock Mills Enterprises, Inc., Rock Valley, IA (US)

( * ) Notice: Subject to any disclaimer, the term of this patent is extended or adjusted under 35 U.S.C. 154(b) by 0 days.

(21) Appl. No.: 12/506,652

(22) Filed: Jul. 21, 2009

(65) Prior Publication Data

US 2009/0279993 A1 Nov. 12, 2009

Related U.S. Application Data

(63) Continuation of application No. 11/437,540, filed on May 19, 2006, now abandoned.

(51) Int. Cl.
*B60P 9/00* (2006.01)
*E01C 23/00* (2006.01)

(52) U.S. Cl. ............................ 404/86; 404/25; 404/83; 404/84.05; 414/462

(58) Field of Classification Search .................. 404/25, 404/72, 83–86; 414/462
See application file for complete search history.

(56) References Cited

U.S. PATENT DOCUMENTS 2,622,750 A 12/1952 Ehlers
3,045,620 A 7/1962 Buck
3,281,880 A 11/1966 Bender
4,088,232 A 5/1978 Lilly
4,323,329 A 4/1982 Chlad
4,365,925 A 12/1982 Girtz
4,776,750 A 10/1988 Griswold et al.
4,789,072 A 12/1988 Quam et al.
4,826,388 A 5/1989 Golding
4,928,927 A 5/1990 Fredrick et al.
5,035,336 A 7/1991 Schmitz et al.
5,070,564 A 12/1991 Fey
5,125,786 A 6/1992 Baker et al.
5,458,435 A 10/1995 Kohno
5,470,171 A 11/1995 Tseng
5,865,425 A 2/1999 Meadows
5,956,079 A 9/1999 Ridgley
5,977,730 A 11/1999 Clutter et al.
6,164,898 A 12/2000 Taylor
6,767,177 B2 7/2004 Opitz
6,945,742 B2 9/2005 Roberts
2004/0042886 A1 3/2004 Roberts

*Primary Examiner*—Raymond W Addie
(74) *Attorney, Agent, or Firm*—Fredrikson & Byron, P.A.

(57) ABSTRACT

A cover removal apparatus includes a frame, an electromagnet and a power source, which is electrically coupled to the electromagnet for selectively energizing the electromagnet. The removal apparatus may further include means for positioning the electromagnet relative to a cover and/or means for loosening the cover.

11 Claims, 10 Drawing Sheets

MAGNETIC COVER REMOVER

This is application is a continuation of U.S. application Ser. No. 11/437,540, filed May 19, 2006, now abandoned , which is hereby incorporated by reference, in its entirety.

FIELD

The present invention relates to the field of lifting devices and more specifically devices for lifting and removing covers. Certain embodiments of the present invention are directed towards a magnetic device for removing manhole covers. Some of these certain embodiments are directed towards a manhole cover remover having an apparatus to loosen a stuck manhole cover.

BACKGROUND

Covers can be used to close holes leading from the street level down to a sewer or other utility connection. The covers allow cars and other vehicles to traverse the road without falling into the hole. Of course, before such holes can be entered their covers must be removed. Such covers are often made of cast iron and tend to be difficult to maneuver because of their size and weight. For example, manhole covers can weigh between 75-400 pounds.

Typically, manhole covers are removed using a long metal rod with a hook at the end. The hook is inserted into an aperture in the manhole cover. A person then physically lifts the cover off the casting that the cover rests on. This can be difficult due to the resting weight of the manhole cover. Further, these covers often stick to the casting thus making it more difficult to lift the cover. To free the covers, typically a person must pound on them with a maul or similar tool. Commonly one person will lift the cover while another person hammers on the cover. The combination of the two forces typically breaks the stuck cover loose. However, injuries to the back, toes, hands, and fingers of the workmen are not uncommon due to the difficulties in handling these heavy manhole covers. Further, there are other safety issues regarding the hook slipping while a person pulls on the cover. During removal, for instance, a person manually removing the cover risks losing balance and falling backwards into traffic if the hook slips while under tension.

SUMMARY

A cover removal apparatus in embodiments of the invention may include one or more of the following features: (a) a frame, (b) an electromagnet, (c) a power source electrically coupled to the electromagnet for selectively energizing the electromagnet, (d) means for positioning the electromagnet relative to a cover, the means for positioning coupled to the frame and to the electromagnet, (e) means for loosening the cover, and (f) a hydraulic actuator that forces the second hydraulic ram and the hammer toward the cover to apply a loosening force to the cover with the hammer device.

A cover removal apparatus in embodiments of the invention may include one or more of the following features: (a) a frame, (b) an electromagnet, (c) a power source electrically coupled to the electromagnet for selectively energizing the electromagnet, (d) means for positioning the electromagnet relative to a cover, the means for positioning coupled to the frame and to the electromagnet, (e) a support assembly for the frame comprising, (i) a ratcheted support stem selectively positionable relative to the frame, (ii) a ground support coupled to the support stem at a first end, (iii) a handle coupled to the support stem at a second end, and (iv) a release tab supported by the frame, the release tab selectively restricting movement between the support stem and the frame.

A method for removing a manhole cover in embodiments of the invention may include one or more of the following steps: (a) positioning an electromagnet overtop of a manhole cover, (b) lowering the electromagnet onto the cover, (c) energizing the electromagnet with a power source, (d) loosening the cover with a cover loosening device adjacent to the electromagnet, (e) lifting the electromagnet with the cover, (f) removing the manhole cover from overtop of a manhole cover casting, (g) lowering the electromagnet and cover a distance from the manhole cover casting and deenergizing the electromagnet, (h) releasing a ratcheted support stem having a wheel at one end a ground surface and locking the ratcheted support stem in place with a release tab, and (i) pulling a handle connected to an opposite end of the ratcheted support stem to lift the wheel off of the ground surface.

DRAWINGS

DESCRIPTION OF VARIOUS EMBODIMENTS

Figure 1:
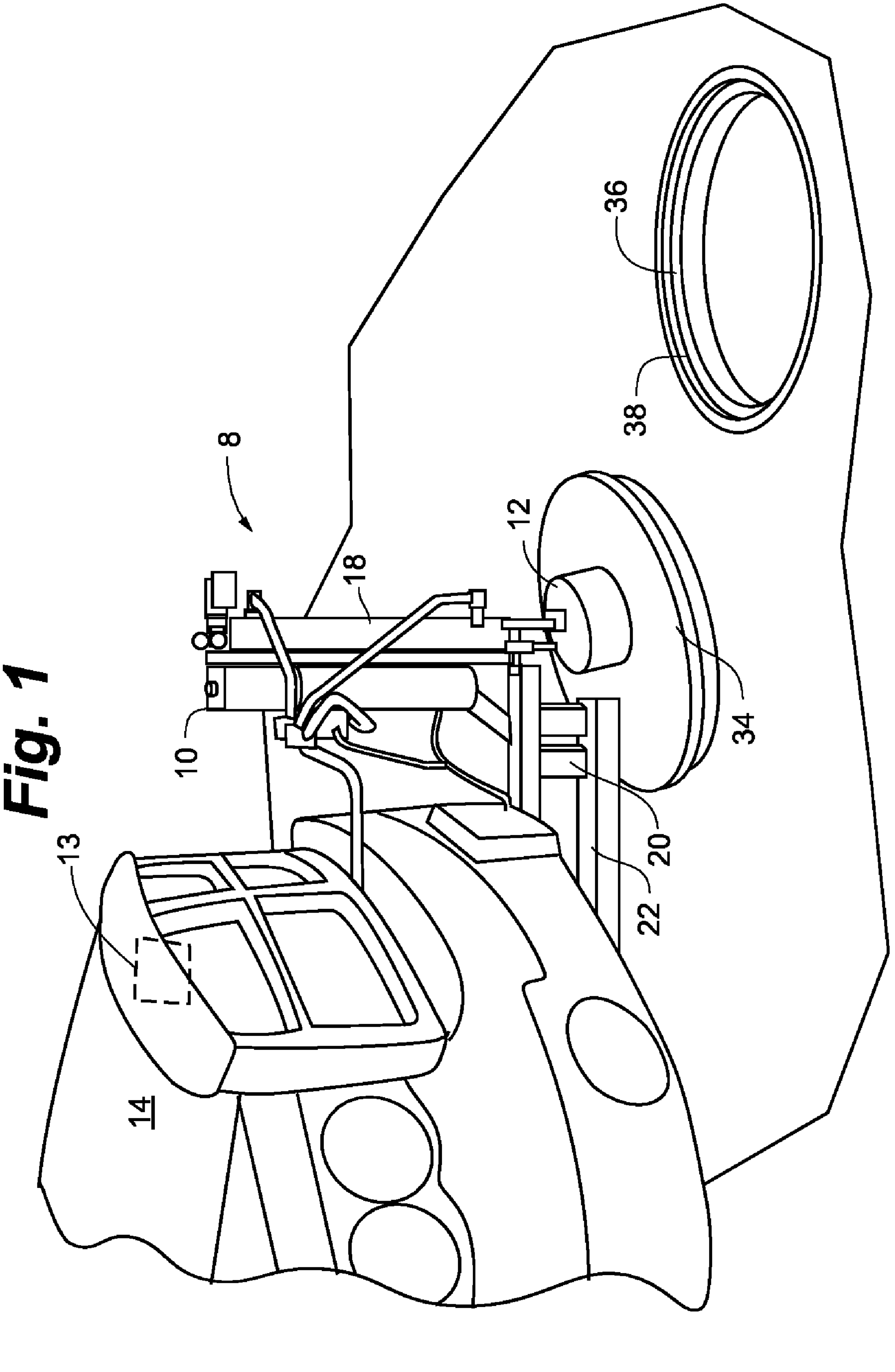
FIG. 1 shows a side profile of general environment for a cover removal system in accordance with the present invention.

The following discussion is presented to enable a person skilled in the art to make and use embodiments of the invention. Various modifications to the illustrated embodiments will be readily apparent to those skilled in the art, and the generic principles herein may be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention. The following introductory material is intended to familiarize the reader with the general nature and some of the features of embodiments of the invention. While the present invention is discussed in detail regarding manhole covers, the present invention is not limited to manhole covers and the inventor fully contemplates that the present invention could be extended to other covers such as storm gates, water caps, and gas caps. Further, while the present invention is discussed in detail regarding the use of a hydraulic ram actuator to lift and remove the covers, other forms of removal, such as a pneumatic lifter, an electric or gas powered motor, and a winch system are fully contemplated without departing from the spirit of the invention.

With reference to FIG. 1, a side profile of a general environment for a cover removal system is shown in accordance with certain embodiments of the present invention. FIG. 1 shows a magnetic cover removal system 8 having a self contained hydraulic power pack 10 and a strong electromagnet 12 for lifting covers. Hydraulic power pack 10, is commercially available from Surplus Center in Lincoln Nebraska, can be powered by vehicle 14 utilizing the vehicle's battery 13 and 12 volt power supply system. Power pack 10 pumps hydraulic fluid to hydraulically power hydraulic ram assembly 16 (shown in FIG. 3), such as a hydraulic actuator commercially available from American Actuators located within hydraulic ram frame 18. Power pack 10 acts to move ram assembly 16 in a vertical motion. Cover removal system 8 can be coupled to vehicle 14 utilizing a commercial riser 20 which can be inserted into a common two inch receiver hitch 22. As will be discussed in more detail below, electromagnet 12 is coupled to the bottom end of vertically mounted ram 16 with a locking pin which can be held in place with a hitch pin clip. However, other methods of attachment are fully contemplated without departing from the spirit of the invention. As stated above, while cover removal system 8 is discussed in detail regarding the use of a hydraulic ram actuator to lift and remove the covers, other forms of removal, such as a pneumatic lifter, an electric or gas powered motor, and a winch system are fully contemplated without departing from the spirit of the invention.

Figure 2:
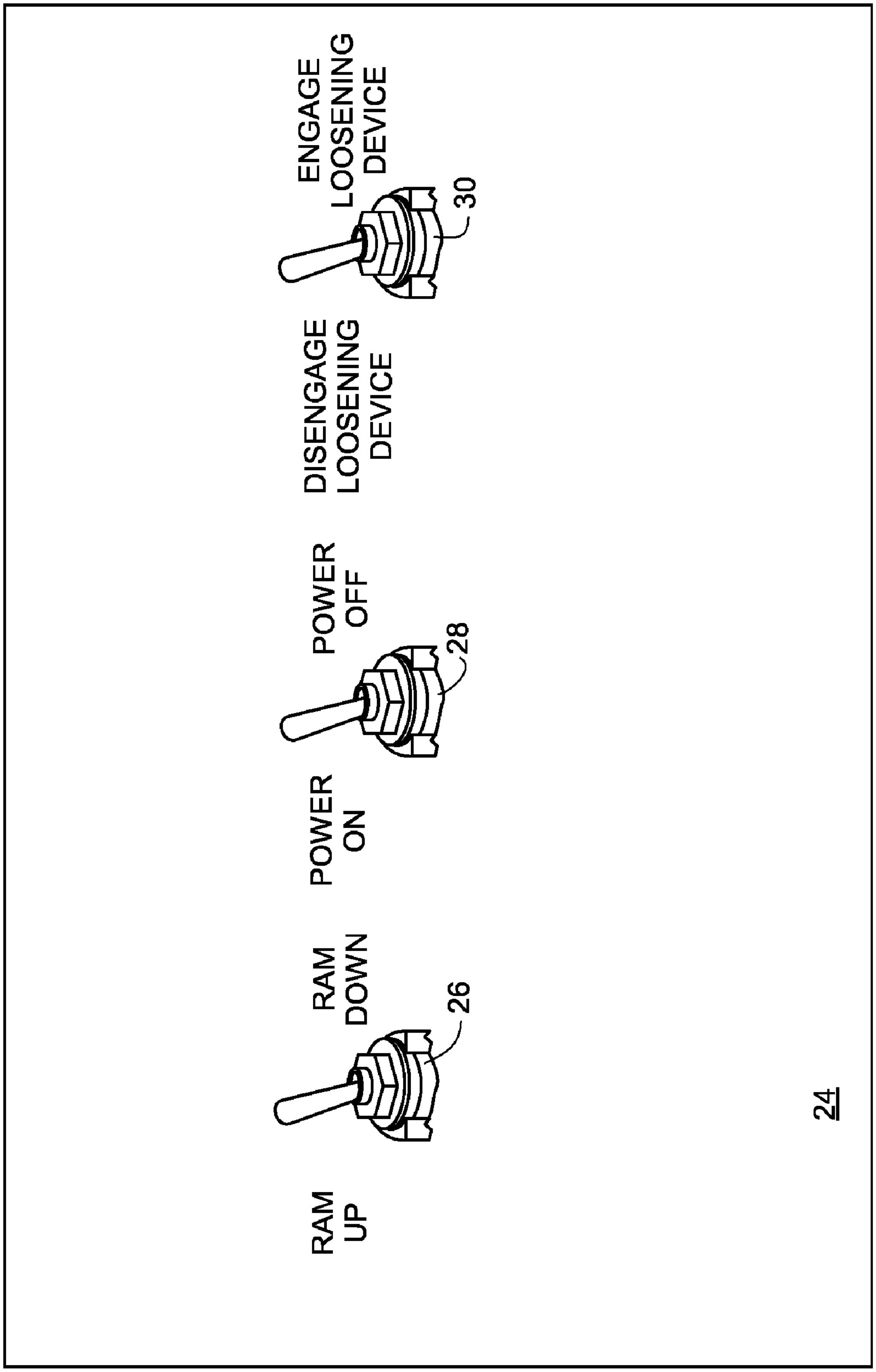
FIG. 2 shows a cover removal system control in an embodiment of the present invention.

With reference to FIG. 2, a cover removal system control in an embodiment of the present invention is shown. Cover removal controls 24 can be used to operate system 8. Controls 24 can be located in the cab of vehicle 14 for easy access by the cover removal system operator. Controls 24 can consist of three three position toggle switches 26, 28, and 30. Toggle switch 26 can operate ram 16 to raise and lower ram 16 and thus magnet 12 as well. If a different apparatus is being used to position magnet 12, such as a pneumatic lifter, motor, or a winch, toggle switch 26 could be used to actuate these devices. Toggle switch 28 operates to turn electromagnet 12 on and off, thus applying magnetic power to electromagnet 12. Toggle switch 30 operates cover loosening device 46 (FIG. 4) which operates a hammer device 52 (FIG. 4), and is discussed in more detail below.

Figure 3:
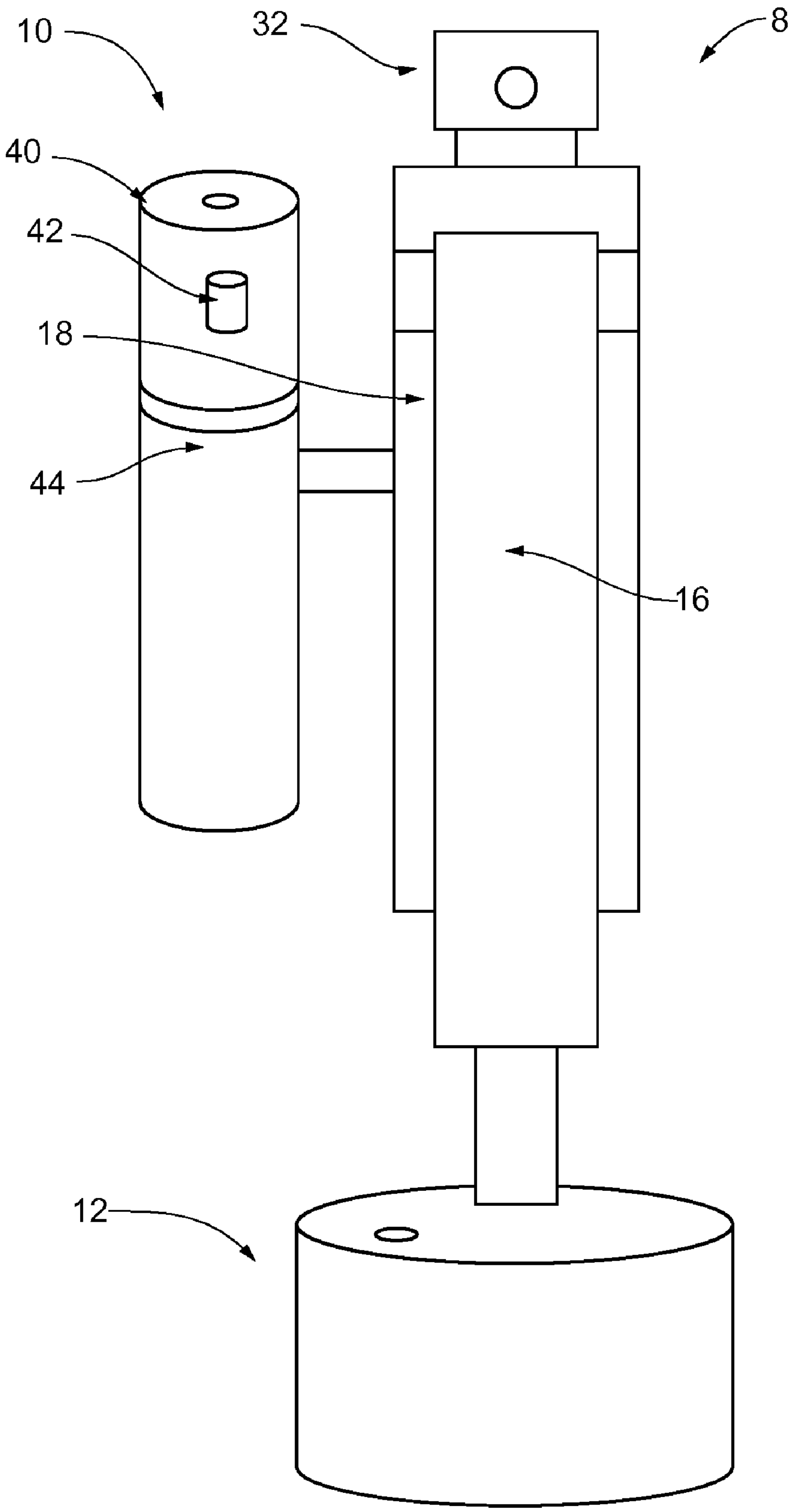
FIG. 3 shows a cover removal system in an embodiment of the present invention.

With reference to FIG. 3, a cover removal system in an embodiment of the present invention is shown. A camera 32 can be mounted to the top of ram frame 18 with the lens of the camera oriented generally downward to display the relationship of magnet 12 to a manhole cover 34 (shown in FIG. 1). A monitor (not shown) is located in the cab of vehicle 14 to show the operator the image captured by the camera. In operation, the operator would drive vehicle 14 towards a manhole 36 (shown in FIG. 1). As the vehicle approaches the manhole 36, the vehicle blocks the operator's ability to see the manhole 36. The operator may then observe the location of the manhole and its cover via the monitor in order to maneuver the vehicle into a position where magnet 12 is directly over manhole 36. Camera 32 then shows the image of manhole cover 34 allowing the operator to guide magnet 12 into position by observing the monitor. The operator can then lower magnet 12 onto cover 34, energize magnet 12, and raise magnet 12 along with cover 34. When cover 34 has cleared casting 38, the operator can drive vehicle 14 forward or backwards with cover 34 still attached to magnet 12. Once clear of casting 38, the operator can lower magnet 12 and remove power to magnet 12 thus releasing cover 34 from magnet 12.

With reference again to FIG. 3, hydraulic motor 40 provides the hydraulic power for system 8. Hydraulic motor 40 can be a 5-horsepower electric motor, however, motor 40 can be most any type of motor without departing from the spirit of the invention. As discussed above, motor 40 can be coupled to the vehicle's 12 volt power system. Motor 40 is electrically coupled to a hydraulic oil pump 42. Hydraulic oil pump 42 can be a two-stage hydraulic oil pump rated at 11 gallons per minute, however, any oil pump could be used without departing from the spirit of the invention. Hydraulic oil pump 42 creates a stream of high-pressure oil, which runs to a valve (not shown) and into hydraulic ram frame 18 to force ram 16 in an upward or downward direction. Ram 16 can be a four inch diameter twenty four inch long hydraulic cylinder, however, most any ram can be used without departing from the spirit of the invention. Tank 44 holds the hydraulic oil that feeds pump 42 and can hold approximately 1.0 gallon of hydraulic oil. Typically, there will also be a filter to keep the oil clean.

Figure 4:
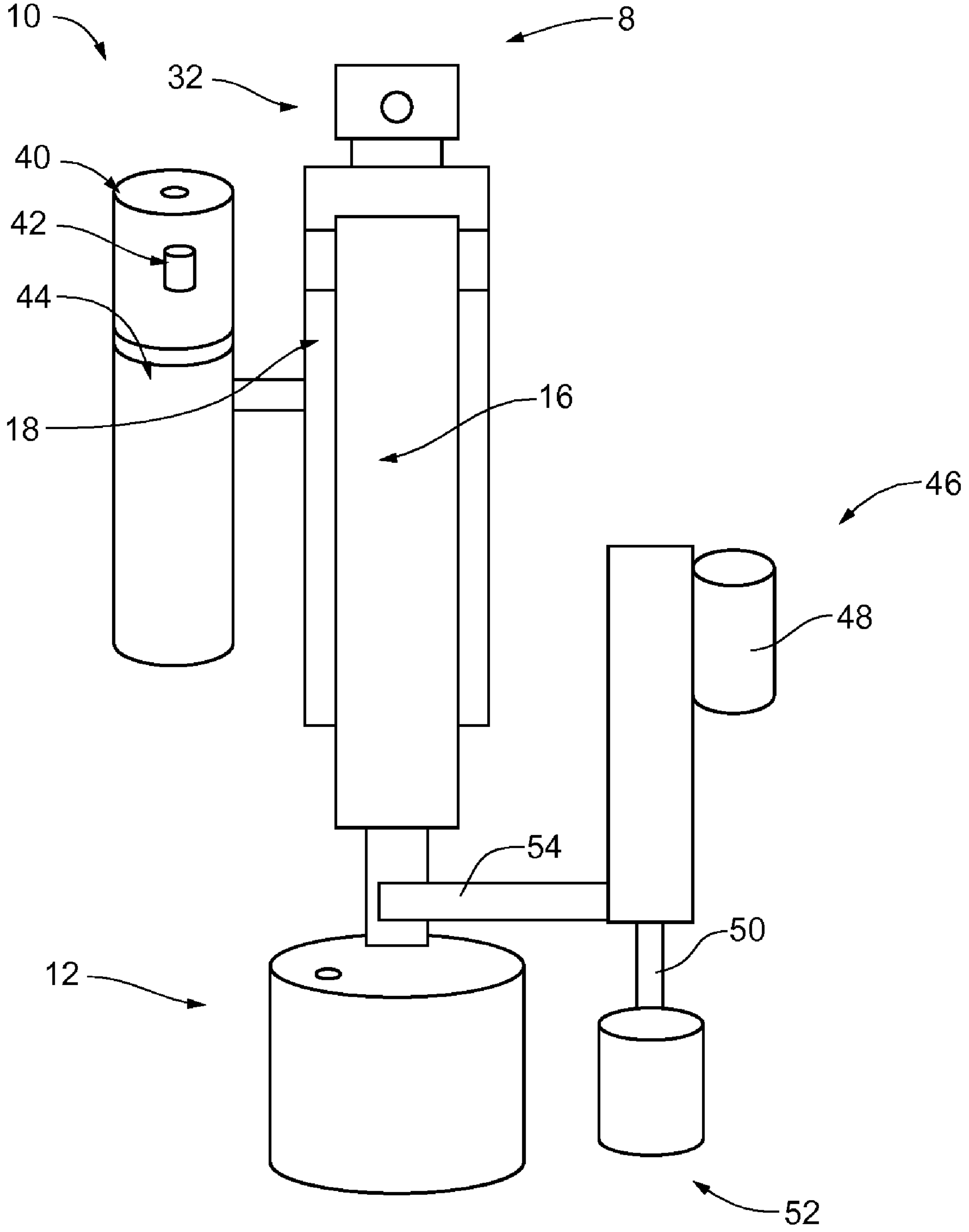
FIG. 4 shows a cover removal system with a cover loosening apparatus in an embodiment of the present invention.

With reference to FIG. 4, an embodiment of a cover loosening apparatus is shown coupled to the cover removal system shown in FIG. 3. Magnetic cover removal system 8 is shown with cover loosening apparatus 46 having a hydraulic actuator 48, hydraulic ram 50, and hammer device 52. In the event that cover 34 is stuck to casting 38 due to tar, rust, or asphalt, a cover loosening apparatus 46 can be used to jar cover 34 loose from casting 38. Hammer device 52 can be located adjacent to electromagnet 12 and coupled to ram 16 via a pin 54. Other methods of coupling magnetic cover removal system 8 with cover loosening apparatus 46 are fully contemplated without departing from the spirit of the invention. Further, it is fully contemplated that cover loosening apparatus 46 does not necessarily have to be coupled to magnetic cover removal system 8 and could be coupled most anywhere else, such as to vehicle 14, without departing from the spirit of the invention. Regardless, if cover loosening apparatus 46 is coupled to removal system 8 or vehicle 14 it is helpful if hammer device 52 and magnet 12 travel at the same height.

Cover loosening apparatus 46 can be powered by hydraulics, such as by an actuator 48, which stores hydraulic pressure. The actuator 48, in turn, can be powered by battery 13, the vehicle's power distribution system, and actuated by toggle switch 30 discussed above. Upon toggling switch 30, actuator 48 forces ram 50 downward causing hammer device 52 to strike cover 34. The force of the impact will hopefully jar cover 34 loose from casting 38. Actuator 48 can hold high pressure fluids or gas such as up to 1000 p.s.i. of nitrogen in the form of an accumulator. The inventors have found that 1000 pounds of pressure works well to loosen cover 34 upon the first impact from hammer device 52.

Figure 5A:
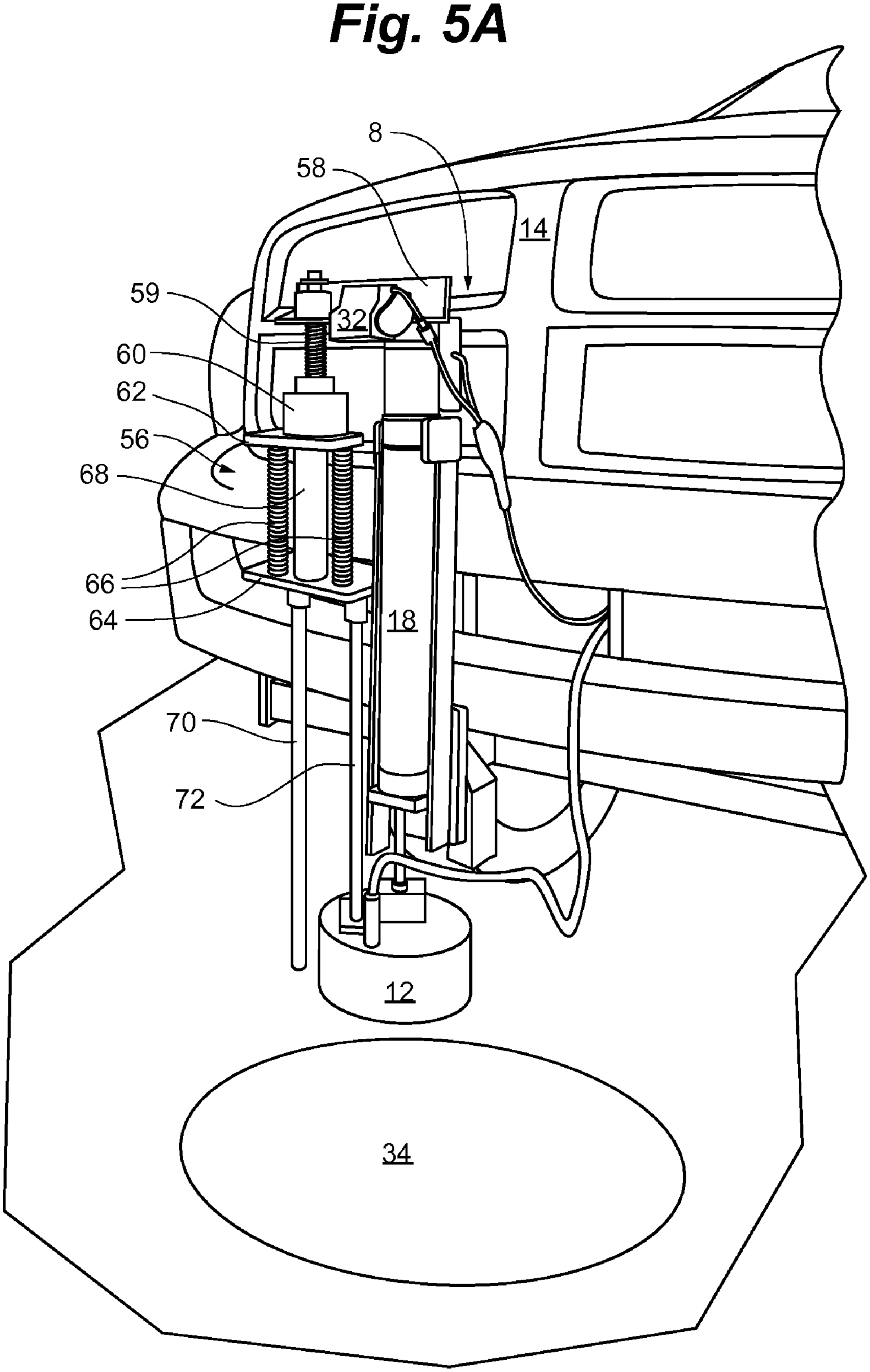
FIG. 5A shows a cover removal system with a cover loosening apparatus in a traveling position in an embodiment of the present invention.
Figure 5B:
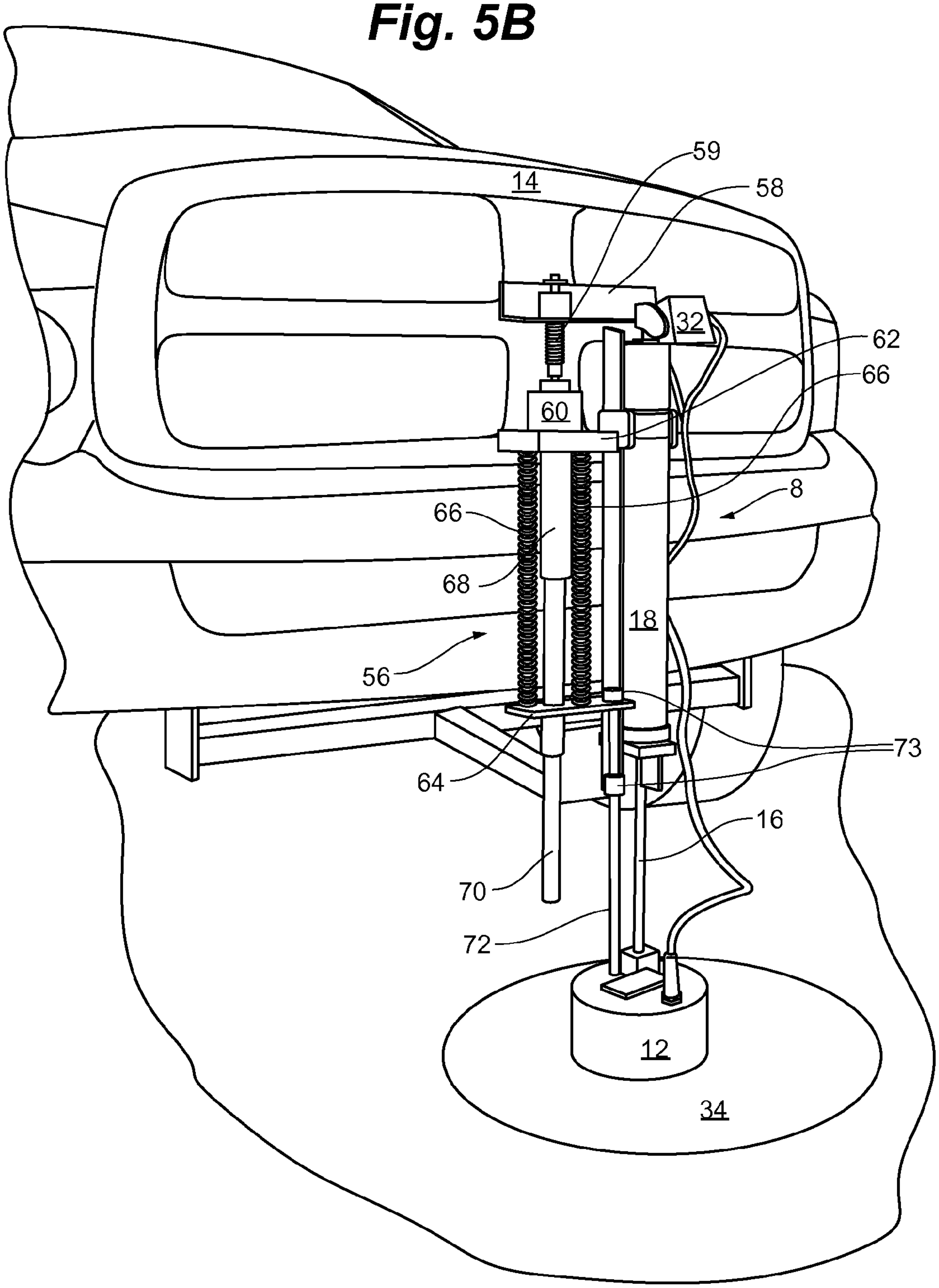
FIG. 5B shows a cover removal system with a cover loosening apparatus in an extended position in an embodiment of the present invention.

With reference to FIG. 5A, a cover removal system with a cover loosening apparatus in a traveling position in an embodiment of the present invention is shown. Cover removal system 8 remains the same as discussed above and any difference will be highlighted below. Cover loosening apparatus 56 can have a mounting bracket 58, small electromagnet 60, a pair of metal plates 62 and 64, springs 66, rod 70, and hammer device 68. In this embodiment, loosening of cover 34 can be performed with mechanical means using springs 66 to deliver the weight of hammer device 68 with the force of expanded springs 66 (FIG. 5B). Electromagnet 60 can be attached to frame 18 of ram assembly 16 with mounting bracket 58. Electromagnet 60 is shown in an energized condition and coupled to metal plate 62. As shown, metal plate 62 is fixedly connected to hammer device 68. Hammer device 68 can be bolted to plate 62, however, any method of attachment is fully contemplated without departing from the spirit of the invention. Further, hammer device 68 can be coupled to or integral with rod 70. Rod 70 can be one inch in diameter and eighteen inches in length, however, most any dimensions can be utilized without departing from the spirit of the invention. Rod 70 traverses through metal plate 64 and can slideably move in a vertical fashion along rod 70 as will be discussed in more detail below. Springs 66 can be attached at one end to metal plate 62 and at another end to metal plate 64.

Metal plate 64 is slidably coupled to pin 72 that is coupled to electromagnet 12. Hammer devices 52 and 68 can be made of most any material, such as wood or a hard plastic, however, for the purposes of this disclosure both hammer device 52 and 68 are made of a hardened metal. Pin 72 can slidably move through an aperture in metal plate 64 between bumpers 73. However, other various methods of attachment of cover loosening apparatus 56 and cover removal system 8 are contemplated without departing from the spirit of the present invention.

Figure 5C:
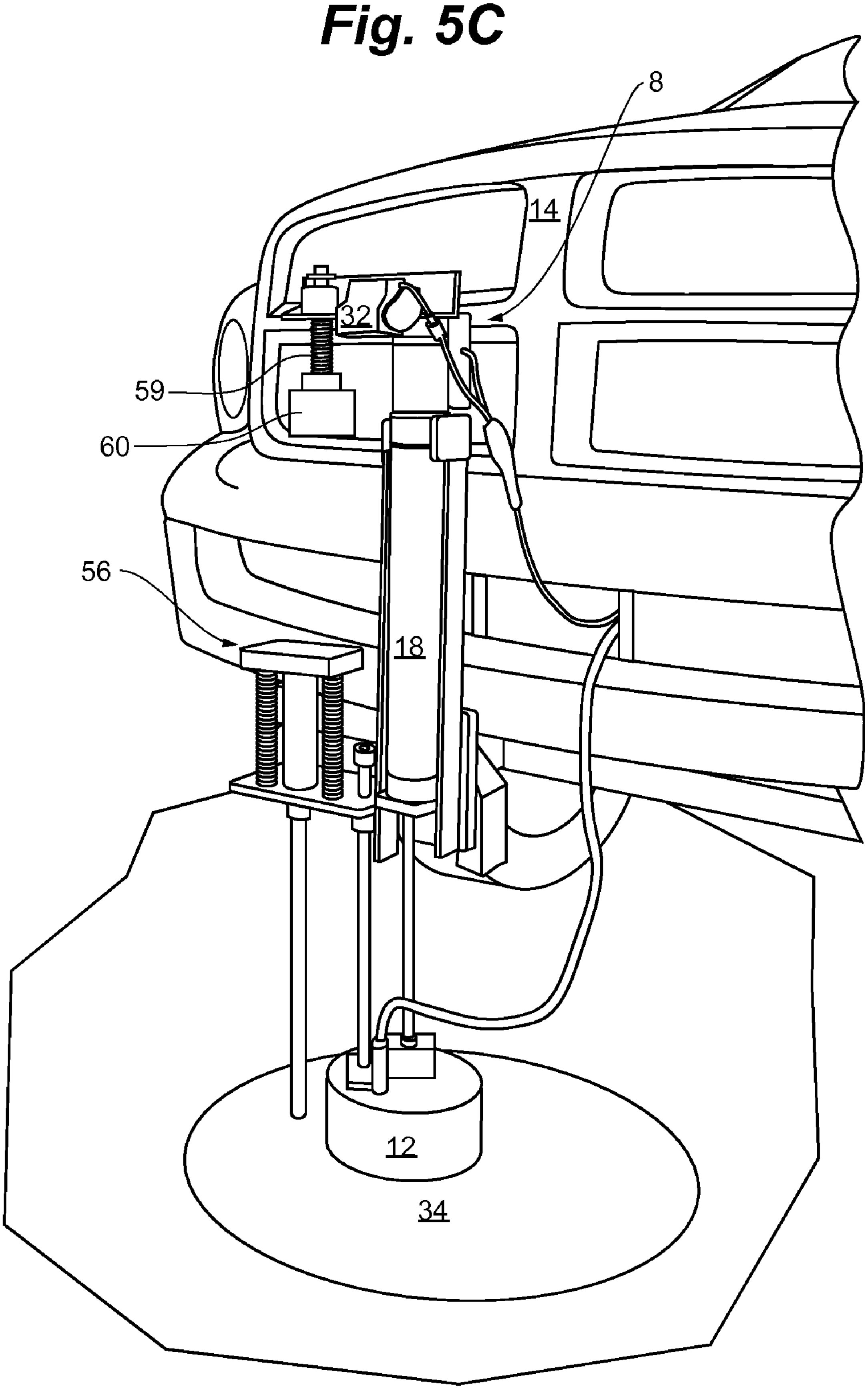
FIG. 5C shows a cover removal system with a cover loosening apparatus in a released position in an embodiment of the present invention.

In operation, electromagnet 60 is energized thus holding metal plate 62 and thus hammer device 68 in place. The operator can then lower electromagnet 12 to cover 34 with toggle switch 26. As electromagnet 12 lowers, upper bumper 73 on pin 72 engages metal plate 64 and begins pulling metal plate 64 downward along rod 70. This action causes springs 66 to expand creating a tension force between upper plate 62 and lower plate 64 (FIG. 5B). Once electromagnet 12 contacts cover 34, the operator can energize electromagnet 34 with toggle switch 28 thus coupling cover 34 to electromagnet 12. The operator can then deenergize electromagnet 60 thus releasing metal plate 62 and hammer device 68. Springs 66 contract with the tension force sending hammer device 68 downward in a forceful manner causing rod 70 to engage cover 34 with a force great enough to hopefully loosen cover 34 from casting 38 (FIG. 5C). However, if cover 34 is still stuck to casting 38, power can be reapplied to magnet 60 to pull metal plate 62 back upward and the process can be repeated until cover 34 is loosened from casting 38. If cover 34 was successfully loosened, the operator can toggle switch 26 raising cover 34 off of casting 38. As electromagnet 12 is traveling upward, lower bumper 73 engages metal plate 64 moving metal plate 64, springs 66, metal plate 62, and hammer device 68 upward. When electromagnet 12 is fully raised the operator can apply power to electromagnet 60 with toggle switch 30 placing cover loosening apparatus 56 in condition for traveling with vehicle 14 (FIG. 5A). However, it is not necessary for magnet 60 to be energized for cover loosening apparatus 56 to travel with vehicle 14. Spring 59 located just above magnet 60 provides tension when magnet 12 is retracted by pushing metal plate 62 against magnet 60.

Figure 6:
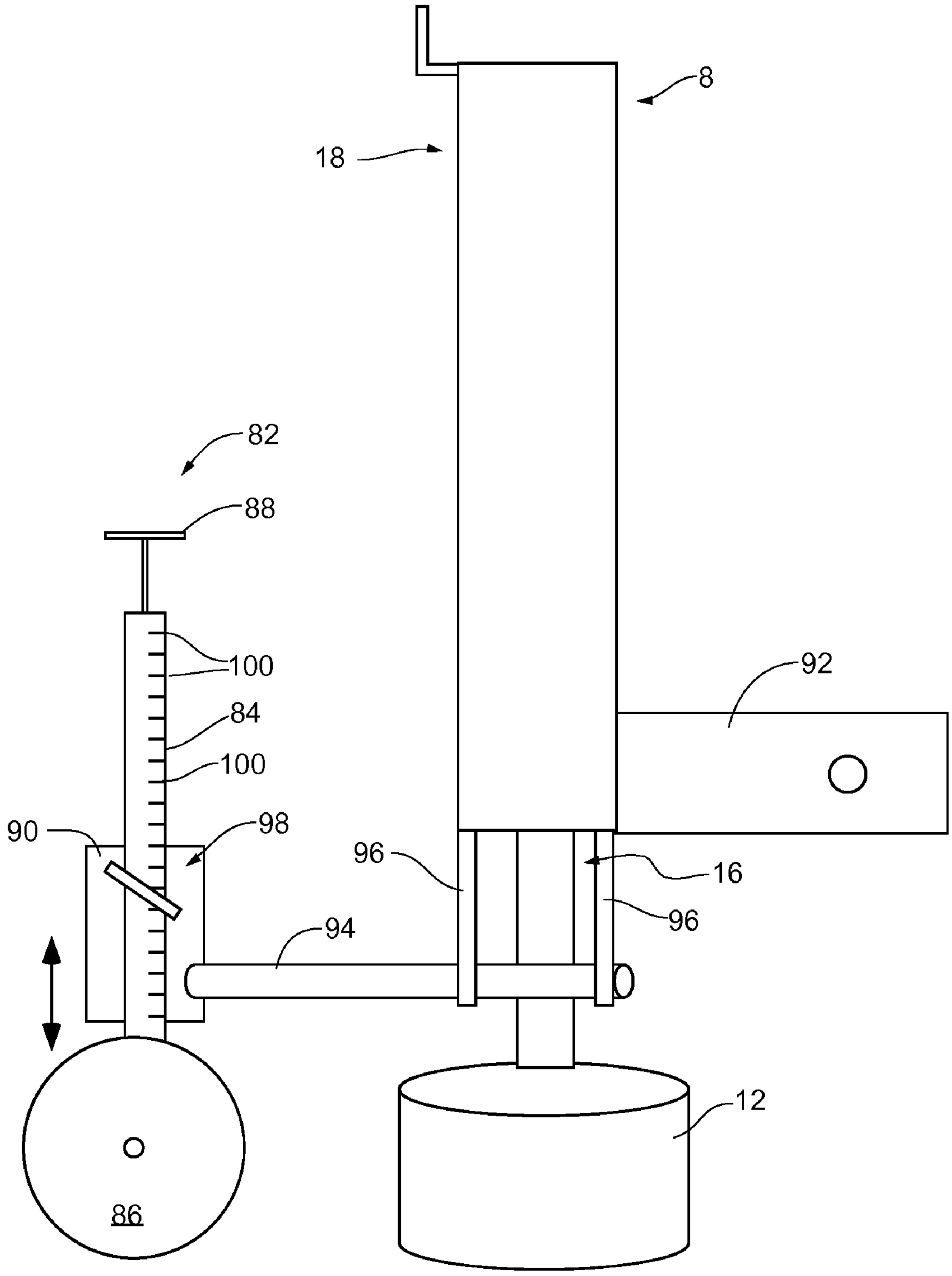
FIG. 6 shows a cover removal system with a support assembly in an embodiment of the present invention.

With reference to FIG. 6, a cover removal system with a support assembly in an embodiment of the present invention is shown. Cover removal system 8 is the same as that discussed in FIG. 3, except for the differences discussed below. Support assembly 82 has a ratcheted support stem 84, a ground support 86 (e.g., wheel) coupled to support stem 84 at a first end, a handle 88 coupled to the support stem at a second end, and a release tab 90 coupled to the ratcheted support stem. Support assembly 82 provides a support for cover removal system 8. In the event cover removal system 8 is extended away from vehicle 14, such as being attached to an extended swing arm 92, support assembly 82 could be used to provide support for cover removal system 8. The swing arm 92 or mounting arm extends from hitch 22 in order to mount cover removal system 8 to vehicle 14. Arm 92 is commonly a piece of two inch metal tubing extended from hitch 22 about three to six feet. As shown in FIG. 1, normally cover removal system 8 is located relatively close to vehicle 14. In this structure, the weight of cover removal system 8 and cover 34 is transmitted directly to the frame of vehicle 14. When cover removal system 8 is extended away from vehicle 14 the combined weight of cover removal system 8 and cover 34 cannot be totally supported by vehicle 14 and thus needs to be supported in another manner. Support assembly 82 can be mounted adjacent to ram frame 18, such as directly to vehicle 14, directly to swing arm 92, or directly to ram frame 18.

In the embodiment shown in FIG. 6, support assembly 82 is fixedly mounted to ram frame 18 to support ram frame 18. A mounting pin 94 is coupled at one end to mounting brackets 96 which extend from ram frame 18 to secure support assembly 82 adjacent to ram frame 18. At the opposite end of mounting pin 94 is a sleeve 98 which slidably receives ratcheted support stem 84. Mounting brackets 96 do not fixedly connect to magnet 12 or ram 16, such that magnet 12 and ram 16 move independently of the support assembly 82.

In operation, when electromagnet 12 is lowered onto cover 34, energized, and ready to lift, an operator lifts release tab 90 of sleeve 98. Release tab 90 is pivots relative to the sleeve 98 about a horizontal axis. Tab 90 is adapted to selectively engage one of the slots of support stem 84 to hold stem 84 in a vertical position relative to sleeve 98. Sleeve 98 acts as a collar encompassing support stem 84. When tab 90 is pivoted out of a slot, ratcheted support stem 84 is permitted to freefall until ground support 86 contacts the surface a distance away from cover 34. Ratcheted support stem 84 self-locks into place relative to sleeve 98, because tab 90 of sleeve 90 that engages one of notches 100 when ground support 86 contacts the ground surface. Cover removal system 8 is now supported at two locations, vehicle 14 and at support assembly 82. The operator can now lift cover 34 via ram 16 and magnet 12 with support assembly 82 supporting the ram frame 18 against the pull of the lifting force generated.

As shown, ground support 86 is a swivel wheel which can freely rotate about 360 degrees about stem 84. Thus, when cover removal system 8 has lifted cover 34 via ram 16 and magnet 12, the operator can get into vehicle 14 and move vehicle 14 with support assembly 82 still supporting the weight and move in any direction in a swivel motion with vehicle 14. However, it is fully contemplated that cover 34 could be manually pushed or pulled out of the way without departing from the spirit of the invention. When ready, the operator can then lower magnet 12 and cover 34, release cover 34, and raise magnet 12. The operator can then release the locking tab (by pivoting it out of the selected slot), grasp handle 88 on top of support assembly 82, and lift ground support 86 off of the ground surface where release tab 90 will engage one of notches 100 on ratcheted support stem 84 self locking in place off of the ground. Support assembly 82 is now ready to travel in a non-supporting fashion.

Figure 7:
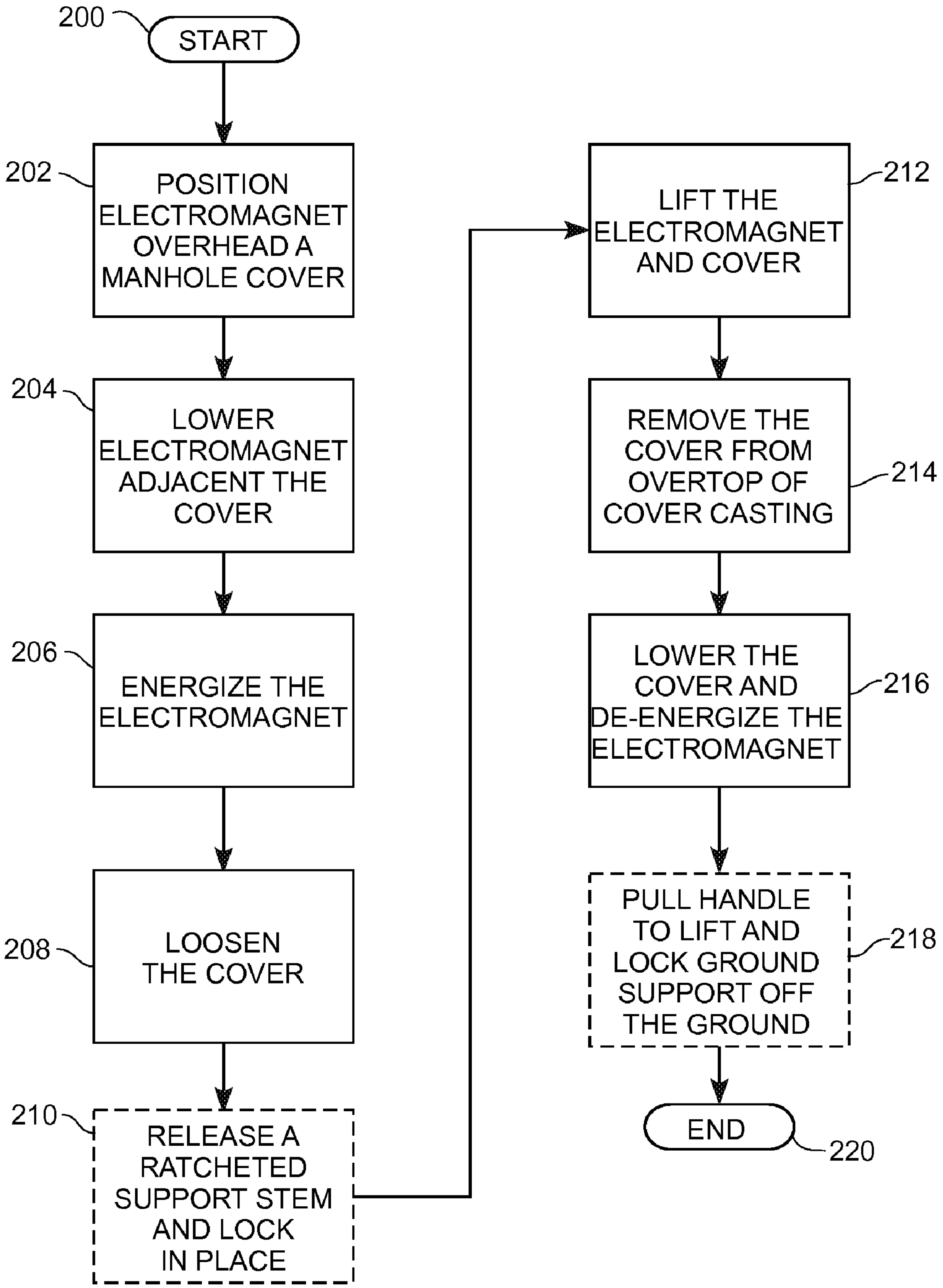
FIG. 7 shows a flowchart for a cover removal method in an embodiment of the present invention.

With reference to FIG. 7, a flowchart for a cover removal method in an embodiment of the present invention is shown. At state 200 the operator could begin the cover removal process. At state 202, the operator could position electromagnet 12 over a cover 34. Electromagnet 12 could then be lowered onto or adjacent to cover 34 at state 204. The operator could then apply power from power source 13 to energize electromagnet 12 at state 206. Cover 34 can be loosened with a cover loosening device at state 208. Optionally, at state 210, the operator could lower a ratcheted support stem 84 from support assembly 82 if it is desired or necessary to have additional weight support. At state 212, the operator could flip toggle switch 26 to raise ram 16, electromagnet 12, and cover 34. Cover 34 can then be removed from overtop of casting 38 so that access can be had to manhole 36 at state 214. Cover 34 can then be lowered to the ground a distance away from cover casting 38 and electromagnet 12 can be deenergized at state 216. Optionally at state 218, the operator could grab handle 88 of support assembly 82 and raise ratcheted support stem 84 thus lifting ground support 86 off of the ground. The operation is then complete at state 220 and the operator can now perform whatever work is necessary in manhole 36.

Figure 8:
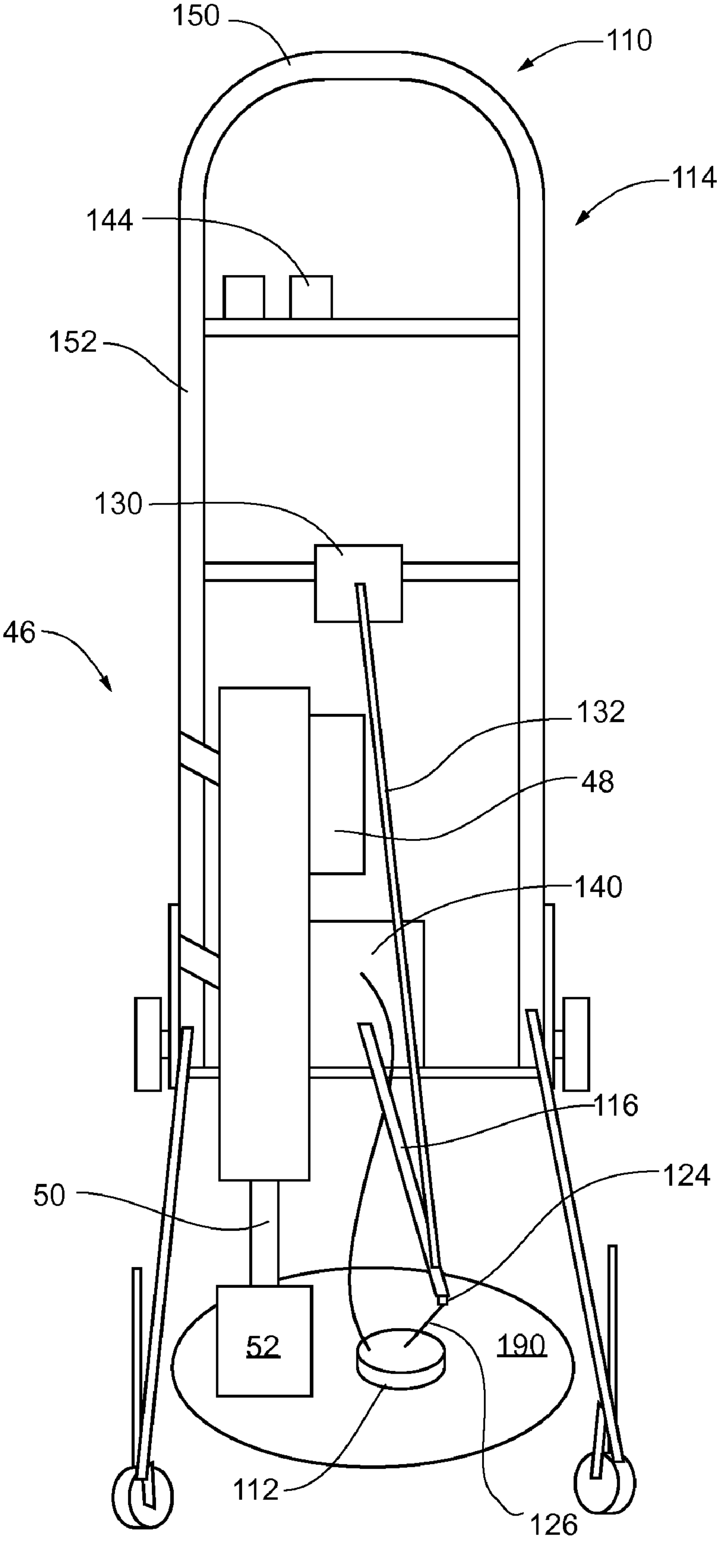
FIG. 8 shows a cover removal system with a cover loosening apparatus in an embodiment of the present invention.

With reference to FIG. 8, a cover removal system with a cover loosening apparatus in another embodiment of the present invention is shown. A cover remover 110 is provided with an attachment 112; a support 114; a pivot arm 116 joined to support 114; a connector 126 joining attachment 112 to pivot arm 116; a winch 130 joined to pivot arm 116; and a power source 140 in operable communication with winch 130. The attachment 112 may be any device suitable for attachment to a manhole cover 190 such as hooks, clamps, or magnets. Preferably, attachment 112 is an electromagnet. Attachment 112 is joined to pivot arm 116.

Support 114 may be any structure suitable for supporting pivot arm 116. Support 114 can be a dolly 150, such as a two-wheeled dolly 150. As discussed above, support 114 may also be a vehicle 14. Vehicle 14 may be joined to pivot arm 116 and attachment 112. Winch 130, joined to pivot arm 116, may raise and lower attachment 112 relative to manhole cover 190. Power source 140, which may be accessory battery 13 of the vehicle 14, is in operable communication with winch 130.

Pivot arm 116, joined to support 114 may be any extender suitable for positioning attachment 112 toward cover 190. Desirably pivot arm 116 is repositionable to a stored position, which is desired to be vertical near uprights 152. Pivot arm 116 has a proximal end, which may be joined with a hinge to support 114. The distal end of pivot arm 116 may further have a hook or eyelet 124 for connection to connector 126 and cable 132.

Winch 130 may be joined to the distal end of pivot arm 116 via cable 132. Preferably, winch 130 includes a control 144 and wiring. The wiring may join the control to the remainder of winch 130 and may further connect winch 130 to power source 140. Winch 130 should be of suitable size and strength to lift a cover 190 from a street surface.

Power source 140 may be in operable communication with magnet 112 and may be in operable communication with winch 130. The preferred power source 140 is a 12-volt battery, such as those commonly used as accessory batteries in vehicles. Power source 140 provides the power to operate winch 130 and allows use of an electromagnet as the attachment 112.

Cover loosening apparatus 46 is coupled to one of uprights 152 and extends outward from dolly 150. In the event that cover 190 is stuck cover loosening apparatus 46 can be used to jar cover 190 as discussed in detail above.

In operation, a cover 190 may be removed by the steps of: rotating a pivot arm 116 down toward a cover 190. An operator would then connect pivot arm 116 to cover 190. If necessary, the operator would apply power to actuator 48 to send ram 50 downward engaging hammer device 52 forcefully with cover 190, thus hopefully loosening cover 190. The operator can then lift cover 190 upward with winch 130.

Thus, embodiments of the MAGNETIC COVER REMOVER are disclosed. One skilled in the art will appreciate that the present invention can be practiced with embodiments other than those disclosed. The disclosed embodiments are presented for purposes of illustration and not limitation, and the present invention is limited only by the claims that follow.

What is claimed is:

1. A cover removal apparatus, comprising:

a frame attachable to a vehicle;

a first electromagnet coupled to a ram assembly, the ram assembly being supported by and moveable within the frame, so as to lower and raise the first electromagnet;

a power source electrically coupled to the first electromagnet for selectively energizing the first electromagnet in order to electromagnetically couple with a cover; and a spring hammer apparatus attached to the frame via a mounting bracket, the apparatus comprising:

a spring extending from a first end to a second end thereof;

a first plate coupled to the first end of the spring;

a second plate coupled to the second end of the spring, below the first plate;

a rod coupled to the first plate and extending downward therefrom, the rod being slidingly received through an aperture formed in the second plate; and a second electromagnet positioned for electromagnetically coupling with the first plate and being electrically coupled to the power source;

wherein the second plate is coupled to the first electromagnet so that, when the frame is attached to the vehicle, when the ram assembly lowers the first electromagnet over the cover, and when the second electromagnet is energized by the power source to couple with the first plate, the second plate is pulled away from the first plate, thereby stretching the spring; and when the second magnet is deenergized to release the first plate from the electromagnetic coupling, the spring contracts to send the rod into forceful engagement with the cover.

2. The apparatus of claim 1, wherein the spring hammer apparatus farther comprises a connecting pin that couples the second plate to the first electromagnet, the connecting pin including a bumper, a length of the pin being slidingly received through an aperture in the second plate, and the bumper being located above the second plate to engage with the plate for pulling the second plate away from the first plate, when the ram assembly lowers the first electromagnet over the cover.

3. A cover removal apparatus, comprising:

a frame attachable to a vehicle an electromagnet coupled to a ram assembly, the ram assembly being supported by, and moveable within, the frame so as to lower and raise the first electromagnet;

a power source electrically coupled to the electromagnet for selectively energizing the electromagnet in order to electromagnetically couple with a cover;

a support assembly comprising:

a sleeve coupled to the frame via a pin, the pin extending laterally from the frame;

a ratcheted support stem slideably received within the sleeve; and a ground support coupled to an end of the support stem, below the sleeve;

wherein the sleeve includes a tab for selectively engaging any of a plurality of notches of the ratcheted support stem, the notches being spaced apart along a length of the support stem; and the tab selectively engages any of the notches so that the ground support is held by the sleeve either in a raised position, above a ground surface, or in a lowered position, contacting the ground surface, when the frame is attached to the vehicle.

4. The apparatus of claim 3, wherein the support assembly further comprises a handle coupled to another end of the support stem, opposite the ground support, so that the ground support can be lifted from the ground surface when an operator pulls up on the handle.

5. The apparatus of claim 3, wherein the ground support comprises a swivel wheel.

6. A method for removing a manhole cover, comprising:

positioning a first electromagnet over of a manhole cover;

lowering the first electromagnet onto the cover;

stretching a spring between a first plate and a second plate by moving the second plate downward, away from the first plate, the first plate being electromagnetically coupled to a second electromagnet, a first end of the spring being coupled to the first plate and a second end of the spring being coupled to the second plate;

energizing the first electromagnet with a power source;

deenergizing the second electromagnet to release the first plate from the electromagnetic coupling so that the spring contracts to send a rod into forceful engagement with the cover, thereby loosening the cover, the rod being coupled to the first plate and extending downward therefrom; and lifting the first electromagnet with the cover electromagnetically coupled thereto.

7. The method of claim 6, further comprising the step of removing the electromagnetically coupled manhole cover from overtop of a manhole cover casting.

8. The method of claim 6, further comprising the steps of:

lowering the first electromagnet with the cover electromagnetically coupled thereto; and deenergizing the first electromagnet.

9. The method of claim 6, further comprising the steps of:

releasing a ratcheted support stem to lower a ground support into contact with a ground surface in proximity to the manhole cover, the ground support being coupled to an end of the support stem; and locking the ratcheted support stem in place with a release tab.

10. The method of claim 9, further comprising the step of pulling a handle connected to an opposite end of the ratcheted support stem to life the ground support off of the ground surface.

11. The method of claim 6, wherein the first electromagnet is coupled to the second plate such that lowering the first electromagnet causes the stretching of the spring.

* * * * *